US008943380B2

(12) United States Patent
Kruglick

(10) Patent No.: US 8,943,380 B2
(45) Date of Patent: Jan. 27, 2015

(54) FORWARD ERROR CORRECTION FOR A DATA FLOW ASSOCIATED WITH A CONNECTIONLESS PACKET NETWORK SERVICE

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 141 days.

(21) Appl. No.: 13/500,881

(22) PCT Filed: Nov. 29, 2010

(86) PCT No.: PCT/US2010/058231
§ 371 (c)(1),
(2), (4) Date: Apr. 6, 2012

(87) PCT Pub. No.: WO2012/074507
PCT Pub. Date: Jun. 7, 2012

(65) Prior Publication Data
US 2012/0278678 A1  Nov. 1, 2012

(51) Int. Cl.
*H03M 13/00* (2006.01)
*H04L 1/00* (2006.01)

(52) U.S. Cl.
CPC ....... *H04L 1/0056* (2013.01); *H04L 2001/0096* (2013.01)
USPC ...................................................... 714/752

(58) Field of Classification Search
CPC . H04L 1/0057; H04L 1/0041; H03M 13/116; H03M 13/1111; H03M 13/1137
See application file for complete search history.

(56) References Cited

U.S. PATENT DOCUMENTS

| | | | |
|---|---|---|---|
| 2004/0034712 A1* | 2/2004 | Rajwan et al. | 709/231 |
| 2009/0222709 A1* | 9/2009 | Lin et al. | 714/776 |
| 2009/0252134 A1* | 10/2009 | Schlicht et al. | 370/338 |
| 2010/0150120 A1* | 6/2010 | Schlicht et al. | 370/338 |
| 2010/0191859 A1* | 7/2010 | Raveendran | 709/231 |
| 2010/0302991 A1* | 12/2010 | Jalali et al. | 370/313 |

OTHER PUBLICATIONS

Atiquzzaman, Mohammed, et al., Evaluation of SCTP multistreaming over satellite links, 2002, accessed online on Apr. 6, 2012 via http://roland.grc.nasa.gov/~ivancic/papers_presentations/2002/GLOBECOM-1.pdf.
Fu, S. et al., SCTP: State of the art in research, products, and technical challenges, IEEE Communications Magazine 42, No. 4 (2004), pp. 64-76.
Tian, D. et al., Parity Streams: A novel FEC scheme with the stream control transmission protocol, IEEE Communications Letters, vol. 10, No. 6, Jun. 2006.
Wikipedia, Forward error correction, accessed online on Apr. 6, 2012 via http://en.wikipedia.org/wiki/Forward_error_correction, last modified on Mar. 21, 2012.
Australia International Searching Authority, International Search Report and Written Opinion of the International Searching Authority for PCT/US2010/058231, mailed on Feb. 1, 2011.

(Continued)

*Primary Examiner* — Guerrier Merant
(74) *Attorney, Agent, or Firm* — Brundidge & Stanger, P.C.

(57) ABSTRACT

Examples are disclosed for forwarding or receiving a data flow associated with a connectionless packet network service. In some examples the data flow may have been split into a plurality of data streams separately or jointly including forward error correction.

27 Claims, 10 Drawing Sheets

(56) References Cited

OTHER PUBLICATIONS

Biersack, Ernst W., Performance evaluation of Forward Error Correction in ATM networks, in Conference Proceedings on Communications architectures & protocols, 1992, pp. 248-257, Baltimore, Maryland, US.

Cui, L., and Koh, S.J., "Partial CRC Checksum of SCTP for Error Control over Wireless Networks," Wireless Personal Communications, vol. 48, No. 2, pp. 247-260 (2009).

\* cited by examiner

1000 A computer program product.

1002 A signal bearing medium.

1004 instructions for for receiving a data flow associated with a connectionless network service, which, when executed by logic, cause the logic to:

receive a portion of a plurality of encoded data streams, the plurality of encoded data streams split from the data flow, wherein the plurality of encoded data streams were encoded based at least upon each encoded data stream of the plurality of encoded data streams separately including forward error correction;

decode the portion of the plurality of encoded data streams; or recombine the decoded portion of the plurality of encoded data streams to reconstruct the data flow such that the data flow is reconstructed prior to receipt and decoding of all the encoded data streams of the plurality of encoded data streams.

| 1006 a computer-readable medium. | 1008 a recordable medium. | 1010 a communications medium. |
|---|---|---|

FIG. 10

FORWARD ERROR CORRECTION FOR A DATA FLOW ASSOCIATED WITH A CONNECTIONLESS PACKET NETWORK SERVICE

BACKGROUND

Unless otherwise indicated herein, the approaches described in this section are not prior art to the claims in this application and are not admitted to be prior art by inclusion in this section.

Near real-time delivery of packetized data over a network using a connectionless packet network service such as the Internet Protocol (IP) may be important for applications that may have multimedia and/or location-based capabilities. Applications having multimedia and/or location-based capabilities may require real-time or substantially simultaneous delivery of packetized data. For example, packetized data for a multimedia application may include packetized video and audio data. In some examples, the packetized video and audio data may need to arrive at a destination at approximately the same time to have the video match the audio when used by the multimedia capable application. Near real-time delivery may be difficult in a network environment such as the Internet where packetized data may be forwarded via separate routes and/or through various networks to reach a destination.

SUMMARY

The present disclosure describes example methods for forwarding a data flow associated with a connectionless packet network service. The example methods may include splitting the data flow into a plurality data streams and encoding the plurality of data streams based at least upon each data stream of the plurality of data streams separately including forward error correction. Also, the encoded plurality of data streams may be forwarded. In some examples, based upon receipt and decoding of at least a portion of the encoded plurality of data streams, the data flow may be reconstructed prior to receipt and decoding of all the encoded plurality of data streams.

The present disclosure also describes example methods for receiving a data flow associated with a connectionless packet network service. These example methods may include receiving a portion of a plurality of encoded data streams. The plurality of encoded data streams may have been split from the data flow. In some examples, the plurality of encoded data streams may have been encoded based at least upon each encoded data stream separately including forward error correction. Further, the portion of the plurality of encoded data streams may be decoded and recombined to reconstruct the data flow such that the data flow is reconstructed prior to receipt and decoding of all the encoded data streams of the plurality of encoded data streams.

The present disclosure also describes example devices for forwarding a data flow associated with a connectionless packet service. The example devices may have a source stream manager that includes logic. The logic may be configured to split the data flow into a plurality of data streams and encode the plurality of data streams based at least upon each data stream of the plurality of data streams separately including forward error correction. Also, the logic may be configured to forward the encoded plurality of data streams. In some examples, based upon receipt and decoding of at least a portion of the encoded plurality of data streams, the data flow may be reconstructed prior to receipt and decoding of all the encoded plurality of data streams.

The present disclosure also describes example systems for receiving a data flow associated with a connectionless packet network service. The example systems may include a memory configured to maintain an application and a destination stream manager. The destination stream manager may have logic configured to receive a portion of a plurality of encoded data streams for the application. The plurality of encoded data streams may have been split from the data flow. Also, the plurality of encoded data streams may have been encoded based at least upon each encoded data stream separately including forward error correction. In some examples, the logic may be further configured to decode and recombine the portion of the plurality of encoded data streams such that the data flow may be reconstructed prior to receipt and decoding of all the encoded data streams of the plurality of encoded data streams.

The present disclosure also describes example computer program products. In some examples, the computer program products may include a signal-bearing medium having instructions for receiving a data flow associated with a connectionless packet network service. The instructions, which, when executed by logic may cause the logic to receive a portion of a plurality of encoded data streams. The plurality of encoded data streams may have been split from the data flow. The plurality of encoded data streams may have been encoded based at least upon each encoded data stream separately including forward error correction. The instructions may also cause the logic to decode and recombine the portion of the plurality of encoded data streams such that the data flow may be reconstructed prior to receipt and decoding of all the encoded data streams of the plurality of encoded data streams.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 10 illustrates a block diagram of an example computer program product; and

DETAILED DESCRIPTION

Figure 1:
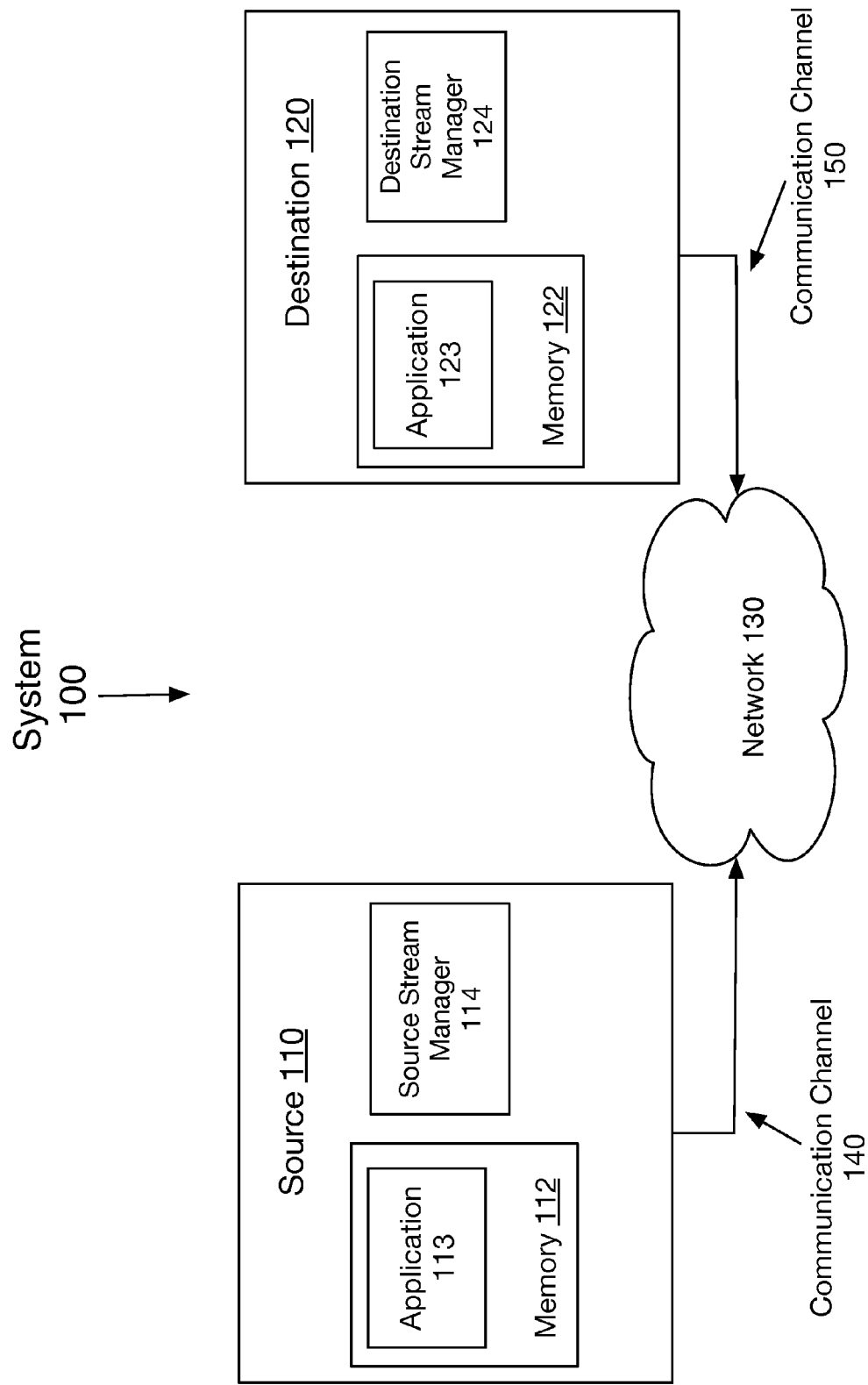
FIG. 1 illustrates an example system for forwarding and receiving a data flow.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to forwarding or receiving a data flow associated with a connectionless packet network service.

As contemplated in the present disclosure, near real-time delivery may be difficult in a network environment such as the Internet where multimedia content in the form of a data flow may be forwarded as packetized data via separate routes to reach a destination. In some examples, a service provider that operates one or more networks that uses a connectionless packet service (e.g., IP) coupled to the Internet may attempt to move sources (e.g., media servers) of multimedia content closer to a destination (e.g., a user) for the multimedia content. A movement closer may resolve or minimize some routing issues, but localized network issues such as network congestion or rerouting due to failing routers in the localized network may still be problematic to near real-time delivery of a data flow associated with the multimedia content. Also, localized network issues may lead to head-of-line (HOL) blocking as the data flow may arrive at the destination out-of-order. In some examples, a transmission protocol commonly used with IP is the transmission control protocol (TCP). TCP has strict order-of-arrival rules that dictate that if a packet is lost in transit a request needs to be made for a new copy of the packet. While waiting for the new copy, the other packets of the entire data flow may be held up.

In some examples, in order to attempt to ameliorate network issues and/or HOL blocking, a data flow may be split into a number of data streams using an alternative transmission protocol to TCP. In some examples, the alternative transmission protocol may be the stream control transmission protocol (SCTP). The use of SCTP may reduce the negative impacts of issues such as network congestion or HOL blocking that may delay the entire data flow. However, separate data streams are still susceptible to network congestion or HOL blocking and this may still delay the entire data flow.

In some examples, methods are implemented for forwarding a data flow associated with a connectionless packet network service. The methods may include splitting the data flow into data streams and encoding the data streams based at least upon each data stream separately or jointly including forward error correction. The encoded data streams may then be forwarded and based on receipt and decoding of at least a portion of the encoded data streams, the data flow may be reconstructed prior to receipt and decoding of all the encoded data streams.

FIG. 1 illustrates an example system 100 for forwarding and receiving a data flow. As shown in FIG. 1, system 100 includes source 110, destination 120 and network 130. As depicted in FIG. 1, source 110 and destination 120 may be separately coupled to network 120 through communication channels 140 and 150, respectively. Also, source 110 is shown in FIG. 1 as including a memory 112 that maintains one or more applications 113, and a source stream manager 114. Further, destination 120 is shown in FIG. 1 as including a memory 122 that maintains one or more applications 123 and a destination stream manager 124.

In some examples, source 110 may forward or transmit a data flow originating from application(s) 113 maintained in memory 112 to destination 120 and application(s) 123 maintained in memory 122. Prior to forwarding, the data flow may be split into a plurality of data streams by source stream manager 114. As described more below, the plurality of data streams may be encoded based at least upon each data stream separately or jointly including forward error correction. In some examples the plurality of encoded data streams may be referred to as "n data streams", where n represents the total number of encoded data streams. The separately or jointly included forward error correction, for example, may be accomplished using any of many schemes and/or algorithms that may provide loss resilience as at least a portion of the n encoded data streams are received at destination 120. As a result of the loss resilience and based upon receipt and decoding of at least a portion of the n encoded data streams, destination stream manager 124 may be able to recombine the data streams to reconstruct the data flow prior to receipt and decoding of all the n encoded data streams. In other words, the data flow can be reconstructed from the arrival of packetized data from k<n encoded data streams. Where k represents the portion of the n encoded data streams received.

According to some examples, the n encoded data streams may be transmitted from source 110 and received at destination 120 via communication channel 140 and communication channel 150, respectively. The n encoded data streams may be transmitted and/or received using a connectionless packet service. The use of the connectionless packet service may include use of an Internet protocol that may be implemented using one or more industry standards for the Internet protocol such as Internet protocol version 4 (IPv4) or Internet protocol version 6 (IPv6). Also, communication channels 140 and 150 may represent wired or wireless communication links to couple source 110 and destination 120 to network 130. In some examples, network 130 may represent the Internet.

As described more below, network 130 may include one or more networks managed by service providers. The one or more networks may further include network nodes or routers to forward the n encoded data streams from source 110 to destination 120. Thus, if a network node fails or delays delivery of packetized data associated with a given encoded data stream, the separately included forward error correction may allow the full data flow to be reconstructed from receipt of a portion of the n encoded data streams without the need to wait for delivery of the delayed given data stream.

Figure 2:
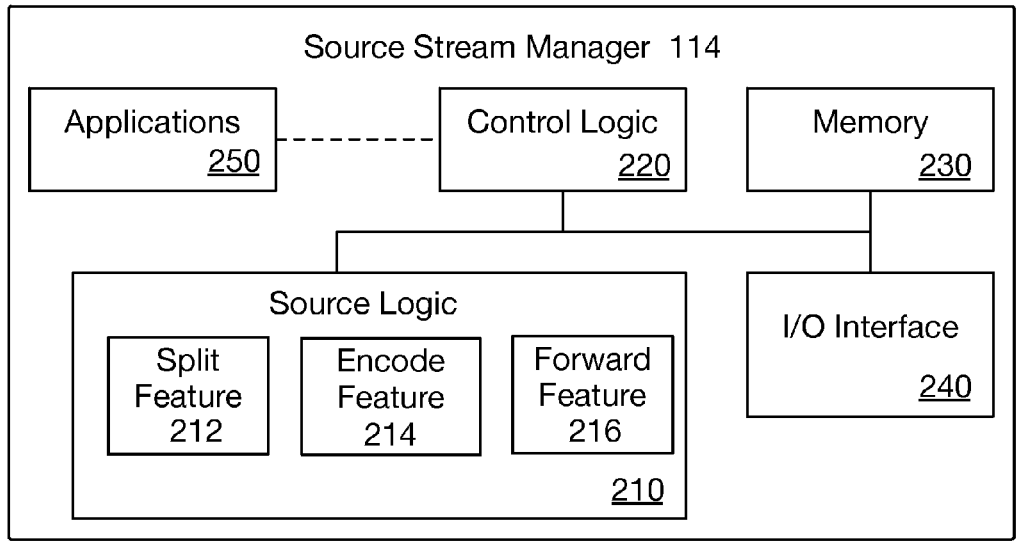
FIG. 2 illustrates a block diagram of an example architecture for a source stream manager.

FIG. 2 illustrates a block diagram of an example architecture for a source stream manager 114. As described above for system 100 in FIG. 1, source 110 may include a source stream manager 114. In some examples, source stream manager 114 includes features and/or logic configured or arranged for forwarding a data flow associated with a connectionless packet network service.

The example source stream manager 114 of FIG. 2 includes source logic 210, control logic 220, memory 230, input/output (I/O) interfaces 240 and optionally one or more applications 250. As illustrated in FIG. 2, source logic 210 is coupled to control logic 220, memory 230 and I/O interfaces 240. Also illustrated in FIG. 2, the optional applications 250 are arranged in cooperation with control logic 220. Source logic 210 may further include one or more of a split feature 212, an encode feature 214 or a forward feature 216, or any reasonable combination thereof.

In some examples, the elements portrayed in FIG. 2's block diagram are configured to support or enable source stream manager 114 as described in this disclosure. A given source stream manager 114 may include some, all or more elements than those depicted in FIG. 2. For example, source logic 210 and control logic 220 may separately or collectively represent a wide variety of logic device(s) to implement the features of source stream manager 114. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 2, source logic 210 includes one or more of a split feature 212, an encode feature 214 or a forward feature 216. Source logic 210 may be configured to use one or more of these features to perform operations. As described in more detail below, example operations may include splitting a data flow into data streams, encoding the data streams and forwarding the encoded data streams using a connectionless packet network service.

In some examples, control logic 220 may be configured to control the overall operation of source stream manager 114. As mentioned above, control logic 220 may represent any of a wide variety of logic device(s) configured to operate in conjunction with executable content or instructions to implement the control of source stream manager 114. In some alternate examples, the features and functionality of control logic 220 may be implemented within source logic 210.

According to some examples, memory 230 is arranged to store executable content or instructions. The executable content or instructions may be used by control logic 220 and/or source logic 210 to implement or activate features or elements of source stream manager 114. Memory 230 may also be arranged to temporarily maintain forward error correction information such as coding schemes or algorithms. The temporarily maintained forward error correction information may be used to enable a split data flow to be reconstructed at a destination (e.g., destination 120).

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface via an internal communication medium or link between source stream manager 114 and elements resident on or located with source 110. I/O interfaces 240 may include interfaces that operate according to various communication protocols to communicate over the internal communication link (e.g., Inter-Integrated Circuit (I²C), System Management Bus (SMBus) or Serial Peripheral Interface Bus (SPI), etc.). I/O interfaces 240 may also provide an interface between source stream manager 114 and elements or devices that may be coupled to source 110. For example, as mentioned above for FIG. 1, source 110 may couple to network 130 via communication channel 140, which couples to destination 120 via communication channel 150. The I/O interfaces 240, for example, may include an interface configured to operate according to various wireless and/or wired communication protocols to allow source stream manager 114 to communicate over these communication channels and/or network connection (e.g., IEEE, 802.1, IEEE 802.11, IEEE 802.16, GSM, GPRS, EDGE, W-CDMA, HSPA, LTE, CDMA-2000, EV-DO, etc.).

In some examples, source stream manager 114 includes one or more applications 250 to provide instructions to control logic 220 and/or source logic 210. Instructions, for example, may include instructions for source stream manager 114 to implement or use one or more of a split feature 212, an encode feature 214 or a forward feature 216.

Figure 3:
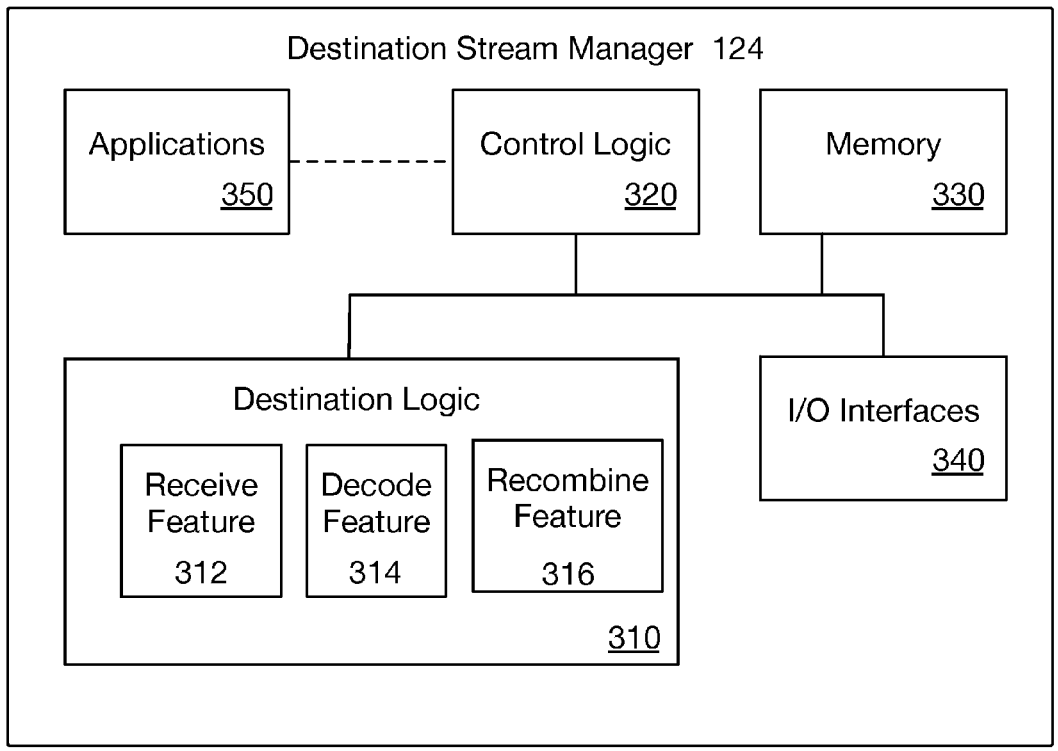
FIG. 3 illustrates a block diagram of an example architecture for a destination stream manager.

FIG. 3 illustrates a block diagram of an example architecture for a destination stream manager 124. As described above for system 100 in FIG. 1, destination 120 may include a destination stream manager 124. In some examples, destination stream manager 124 includes features and/or logic configured or arranged for receiving a data flow associated with a connectionless packet network service.

The example destination stream manager 124 of FIG. 3 includes destination logic 310, control logic 320, memory 330, input/output (I/O) interfaces 340 and optionally one or more applications 350. As illustrated in FIG. 3, destination logic 310 is coupled to control logic 320, memory 330 and I/O interfaces 340. Also illustrated in FIG. 3, the optional applications 350 are arranged in cooperation with control logic 320. Destination logic 310 may further include one or more of a receive feature 312, a decode feature 314 or a recombine feature 316, or any reasonable combination thereof.

In some examples, the elements portrayed in FIG. 3's block diagram are configured to support or enable destination stream manager 124 as described in this disclosure. A given destination stream manager 124 may include some, all or more elements than those depicted in FIG. 3. For example, destination logic 310 and control logic 320 may separately or collectively represent a wide variety of logic device(s) to implement the features of destination stream manager 124. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 3, destination logic 310 includes one or more of a receive feature 312, a decode feature 314 or a recombine feature 316. Destination logic 310 may be configured to use one or more of these features to perform operations. As described in more detail below, example operations may include receiving a data flow that has been split into data streams and encoded, decoding at least a portion of the encoded data streams and recombining the decoded portion of the encoded data streams to reconstruct the data flow.

In some examples, control logic 320 may be configured to control the overall operation of destination stream manager 124. As mentioned above, control logic 320 may represent any of a wide variety of logic device(s) configured to operate in conjunction with executable content or instructions to implement the control of destination stream manager 124. In some alternate examples, the features and functionality of control logic 320 may be implemented within destination logic 310.

According to some examples, memory 330 is arranged to store executable content or instructions. The executable content or instructions may be used by control logic 320 and/or destination logic 310 to implement or activate features or elements of destination stream manager 124. Memory 330 may also be arranged to temporarily maintain forward error correction information and/or decode information. Temporarily maintained forward error correction information and/or decode information may be used to enable a split data flow to be reconstructed at a destination (e.g., destination 120).

Memory 330 may include a wide variety of memory media including, but not limited to, one or more of volatile memory, non-volatile memory, flash memory, programmable variables or states, RAM, ROM, or other static or dynamic storage media.

In some examples, similar to I/O interfaces 240 described above, I/O interfaces 340 may provide an interface via an internal communication medium or link between destination stream manager 124 and elements resident on or located with destination 120. Also similar to I/O interface 240, I/O interfaces 340 may also provide an interface between destination stream manager 124 and elements or devices that may be coupled to destination 120. For example, as mentioned above for FIG. 1, destination 120 may couple to network 130 via communication channel 150 which couples to source 110 via communication channel 140.

In some examples, destination stream manager 124 includes one or more applications 350 to provide instructions to control logic 320 and/or destination logic 310. Instructions, for example, may include instructions for destination stream manager 124 to implement or use one or more of a receive feature 312, a decode feature 314 or a recombine feature 316.

Figure 4:
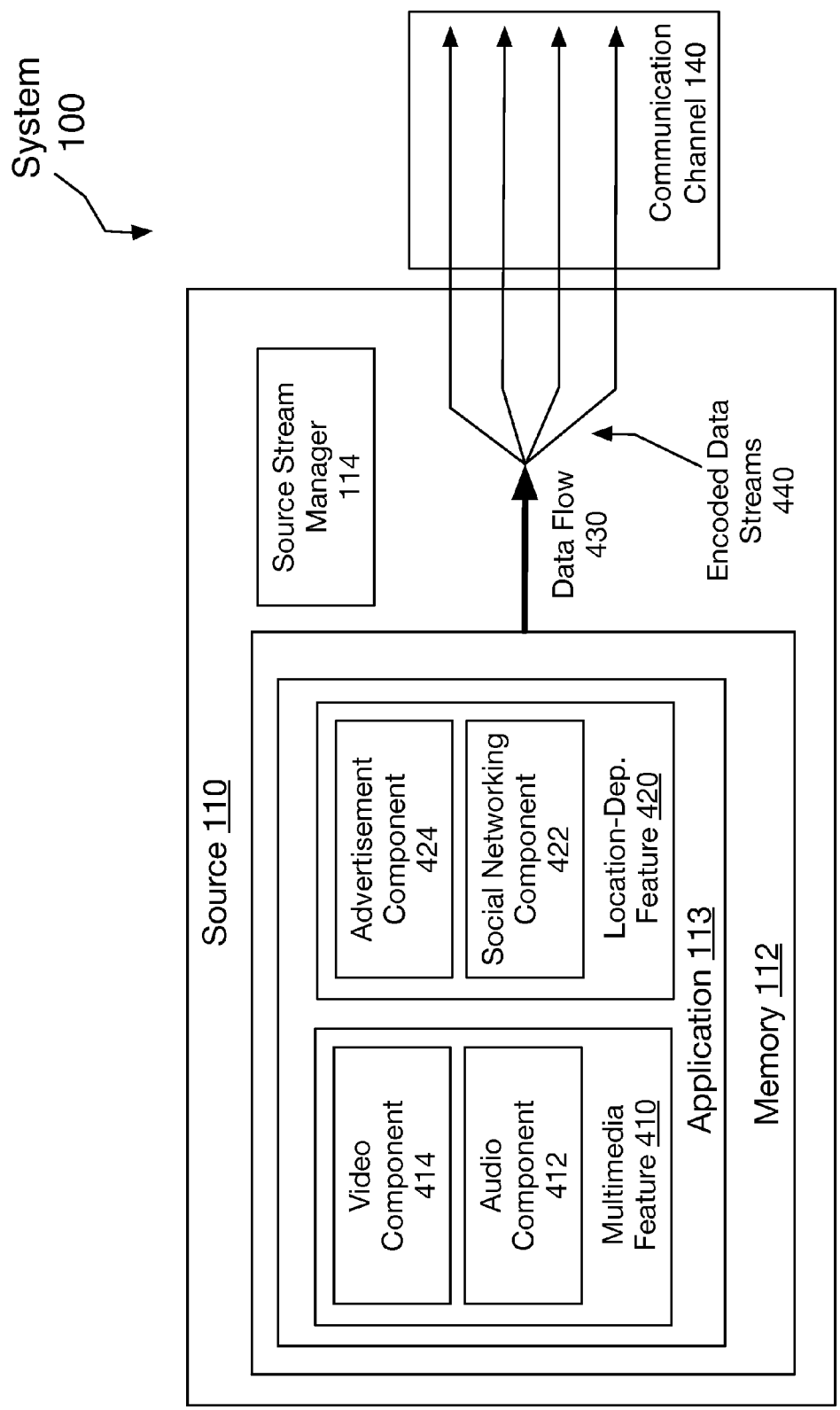
FIG. 4 illustrates an example data flow that has been split into a plurality of encoded data streams and forwarded from a source to a communication channel.

FIG. 4 illustrates an example data flow 430 that has been split into a plurality of encoded data streams 440 and forwarded from source 110 to communication channel 140. As shown in FIG. 4, application 113 maintained in memory 112 may include a multimedia feature 410 having an audio component 412 and a video component 414. Application 113 is also depicted in FIG. 4 as possibly including a location-dependent feature 420 having social networking component 422 and an advertising component 424.

In some examples, application 113 may have multimedia and/or location-dependent capabilities and may implement or use multimedia feature 410 and/or location dependent feature 420 to generate a data flow 430. Source stream manager 114 may then split data flow 430 into n encoded data streams 440. As mentioned above, and described more below, the n encoded data streams may be encoded based at least upon each data stream separately or jointly including forward error correction. As depicted in FIG. 4, encoded data streams 440 may then be forwarded from source 110 to communication channel 140.

In some examples, application 113 may be configured to have multimedia capabilities via multimedia feature 410. Multimedia feature 410 may be implemented such that audio and video data may be generated from audio component 412 and video component 414, respectively. The generated audio or video data may then be combined to form at least a portion of data flow 430.

Also, in some examples, application 113 may be configured to have location-dependent capabilities via use of location-dependent feature 420. Location-dependent feature 420 may be implemented so that location-dependent data such as advertisement data or social networking data may be generated by advertisement component 424 and social networking component 422, respectively.

Location-dependent information generated by advertisement component 424 or social networking component 422 may include, but is not limited to, information that may be based on the location of the destination that may use or consume the information. For example, as shown in FIG. 1, a destination for a data flow forwarded from source 110 may be destination 120. Destination 120 may be physically located in an area via which targeted advertisement data for physically proximate restaurants, events or stores may be generated for a user at or with destination 120. Also, social networking data such as data regarding physically proximate individuals that are part of a same social network for which a user at or with destination 120 may belong. For this example, generated targeted advertisements and social networking data may be combined with audio and/or video data to form at least a portion of data flow 430.

In some examples, source stream manager 114 may include logic and/or features to split data flow 430 (e.g., split feature 212) using a stream control transmission protocol (SCTP). When using SCTP, source stream manager 114 may implement a proposed industry standard. The proposed industry standard may be identified as the Internet Engineering Task Force (IETF), Network Working Group, RFC 4960, Stream Control Transmission Protocol (SCTP), published September 2007 ("RFC 4960"). Also, as described more below, source stream manager 114 may include logic and/or features to encode the data streams (e.g., decode feature 214) to separately or jointly include forward error correction and thus form encoded data streams 440. Further, source stream manager 114 may include logic and/or features (e.g., forward feature 216) to forward encoded data streams 440 from source 110 to communication channel 140.

In some examples, source stream manager 114 may forward encoded data streams 440 from source 110 to communication channel 140 using a connectionless packet service. The connectionless packet service may include using an Internet protocol to forward encoded data streams 440 to communication channel 140 and then to a network coupled to the destination (e.g., destination 120). The Internet protocol may include, but is not limited to, IPv4 or IPv6. Use of the connectionless packet services may include encoded data streams 440 including packetized data. Individual packets of the packetized data may separately carry information in a header (not shown) that includes a destination address (e.g., for destination 120) sufficient to permit the independent delivery of the individual packets to the destination via a network (e.g., network 130) coupled to communication channel 140.

Figure 5:
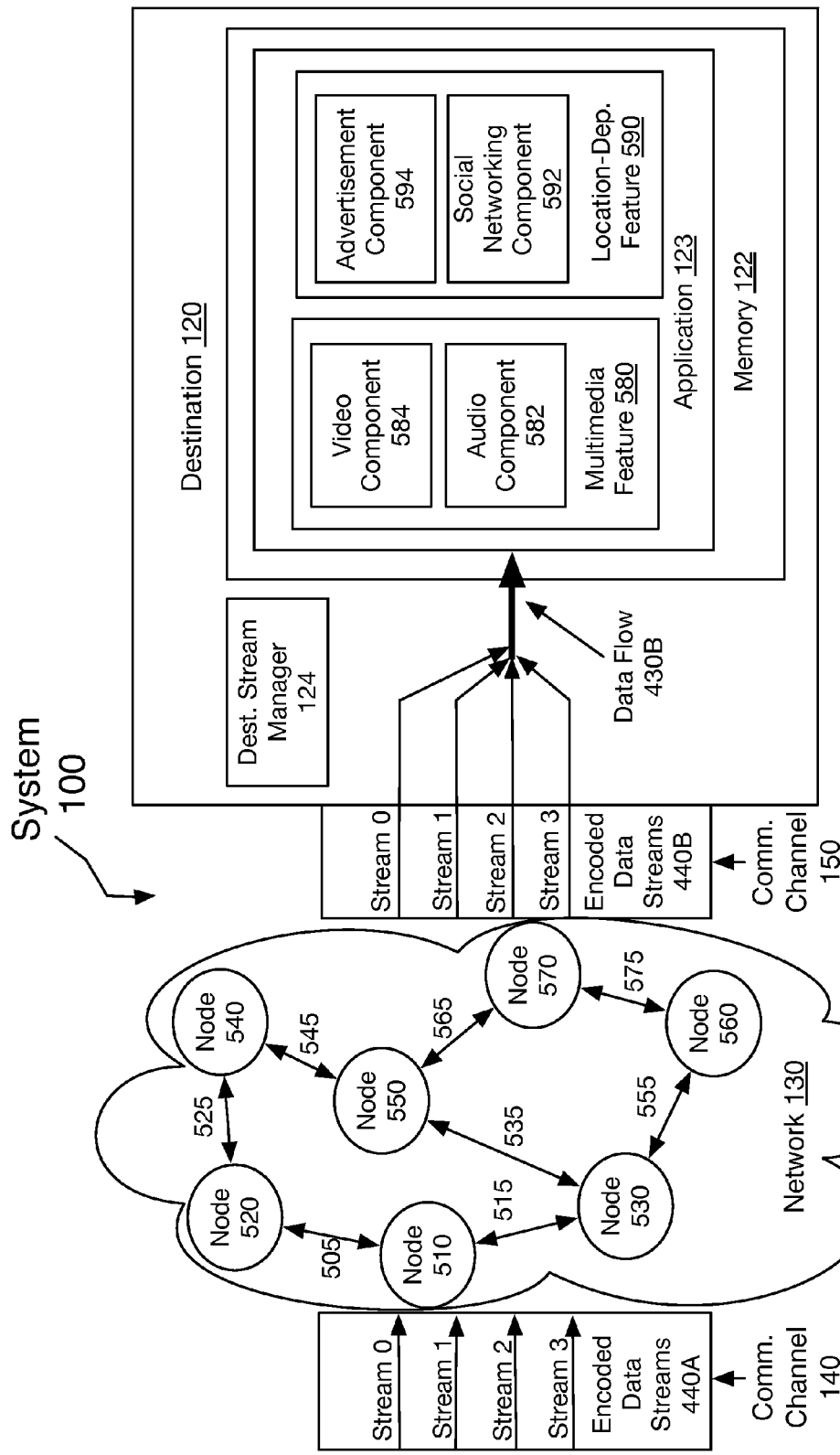
FIG. 5 illustrates a block diagram of a data flow as the data flow is forwarded from a source to a communication channel and then on to a destination.

FIG. 5 illustrates a block diagram of the data flow as the data flow is forwarded from source 110 to communication channel 140 and then on to destination 120. A portion of system 100 that includes communication channel 140, network 130, communication channel 150 and destination 120 is depicted in FIG. 5. In some examples, as shown in FIG. 5, encoded data streams 440A may be forwarded via communication channel 140 and then routed through nodes 510, 520, 530, 540, 550 or 560 of network 130 via a combination of network connections 505, 515, 525, 535, 545, 555, 565 or 575. Also, as shown in FIG. 5, encoded data streams 440B may depict at least a portion of the encoded data streams 440A that may be received at destination 120 via communication channel 150. As shown in FIG. 5, application 123 of memory 122 may include a multimedia feature 580 having an audio component 582 and a video component 584. Application 123 is also depicted in FIG. 5 as possibly including a location-dependent feature 590 having social networking component 592 and an advertising component 594.

In some examples, destination stream manager 124 may include logic and/or features to receive (e.g., via receive feature 312) and decode (e.g., via decode feature 314) at least a portion of encoded data stream 440B and then recombine (e.g., via recombine feature 316) the received and decoded data streams to reconstruct a data flow 430B. As mentioned above for FIG. 4, in some examples, encoded data streams 440 may have been encoded to separately or jointly include forward error correction. As described more below and as a result of separately or jointly including forward error correction, destination stream manager 124 may be able to receive and decode less than all of the encoded data streams 440A forwarded from source 110 to reconstruct a data flow originally generated by application 113 at source 110. The reconstructed data flow is depicted in FIG. 5 as data flow 430B.

In some examples, application 123 may have multimedia capabilities via use of multimedia feature 580. Multimedia feature 580 may be implemented such that audio and video data may be used by audio component 582 and video component 584, respectively, to present audio and video data to a user at or with destination 120. For example, application 123 may be an Internet browser via which a user at destination 120 may consume (e.g., watch, listen, observe, interact, etc.) multimedia content received from source 110. For this example, audio component 582 and video component 584 may be configured to provide the multimedia content to the user.

Also, in some examples, application 123 may include location-dependent capabilities via use of location-dependent feature 590. Location-dependent feature 590 may be implemented so that location-dependent data such as advertisement data or social networking data may be used by advertisement component 594 and social networking component 592, respectively, to present location-dependent data to the user at or with destination 120. For example, as mentioned above, application 123 may be an Internet browser via which a user of destination 120 may consume location-dependent content (e.g., targeted advertisements, coupons, social network contacts, etc.) received from source 110. For this example, advertisement component 594 and social networking component 592 may be configured to provide the location-dependent content to the user.

In some examples, destination stream manager 124 may include logic and/or features to receive, decode and recombine encoded data streams 440B to reconstruct data flow 430B using SCTP. Similar to source stream manager 114, when using SCTP, destination stream manager 124 may implement the proposed industry standard of RFC 4960. Also, in some examples, destination stream manager 124 may receive encoded data streams 440B from source 110 via communication channel 150 using a connectionless packet service. The connectionless packet service may include using an Internet protocol to receive encoded data streams 440B.

Figure 6:
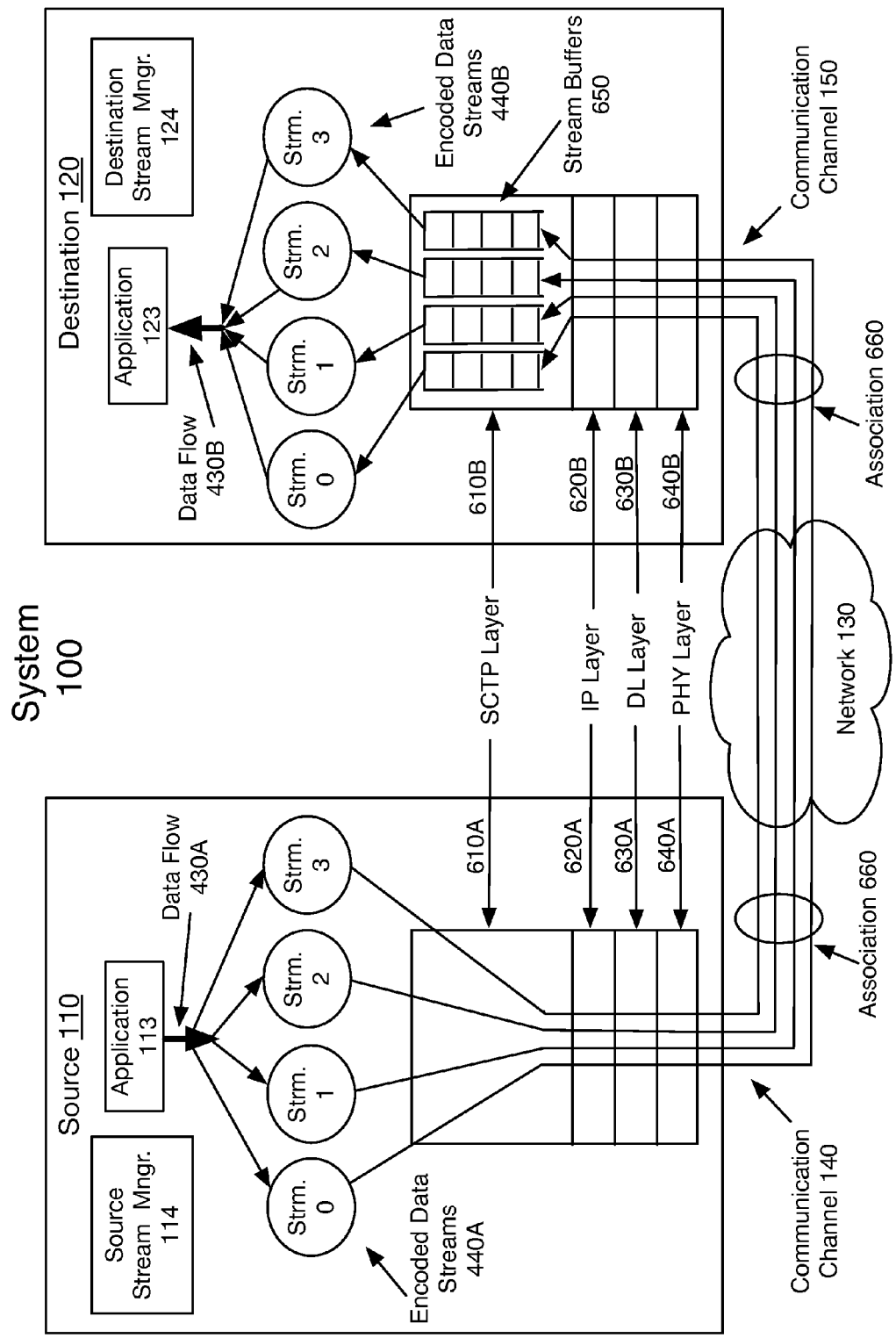
FIG. 6 illustrates a block diagram of the data flow as the data flow is split into data streams at a source, forwarded to a destination and reconstructed.

FIG. 6 illustrates a block diagram of data flow 430A as data flow 430A is split and encoded into encoded data streams 440A at source 110, forwarded to destination 120 and reconstructed as data flow 430B. In some examples, source stream manager 113 may split data flow 430A into a plurality of data streams and encode the data streams to generate encoded data streams 440A. As shown in FIG. 6 separate stream control transport protocol (SCTP), Internet protocol (IP), data link (DL) and physical (PHY) layers 610A-640A may be included at source 110. These separate layers at source 110 may be used to packetize and forward encoded data streams 440A from source 110 to communication channel 140. Also depicted in FIG. 6 are similar separate SCTP, IP, DL and PHY layers 610B-640B included at destination 120. Destination stream manager 124 may use and/or interact with these separate layers at destination 120 to receive and decode encoded data streams 440B.

Also depicted in FIG. 6 are stream buffers 650 at destination 120. In some examples, stream buffers 650 may be buffers or queues maintained in memory 122 of destination 120. As described more below, buffers 650 may be configured to receive the packetized data of separate streams from among encoded data streams 440B. The packetized data received in buffers 650 may then be decoded and recombined by destination stream manager 124 to reconstruct data flow 430B. Then, as shown in FIG. 6, data flow 430B may be presented or forwarded to application 123.

In some examples, the encoded data streams 440A may have been first split at the SCTP layer at source 110 according to the proposed industry standard of RFC 4960. As part of the use of SCTP, Encoded data streams 440A may have been associated with each other such that resources expended to packetize and forward encoded data streams 440A to a destination may be shared. By associating the streams using SCTP, connection overhead, multihoming behavior, and multi-destination broadcast behavior may be shared. An example of an association 660 is depicted in FIG. 6. Association 660 may demonstrate how encoded data streams 440A may maintain an association as the encoded data streams 440A are forwarded from source 110 to communication channel 140, over network 130, to communication channel 150. Encoded data streams 440B may then be received at destination 120 via communication channel 150 and forwarded or passed through at least PHY layer 640B, DL layer 630B and IP layer 620B and recombined at SCTP layer 610B to reconstruct data flow 430B.

According to some examples, data streams 440A may have been encoded based upon each data stream separately or jointly including forward error correction. As mentioned above, separately or jointly included forward error correction may enable destination stream manager 124 at destination 120 to recombine encoded data streams 440B to reconstruct data flow 430B based on receiving and decoding at least k encoded data streams of n encoded data streams 440A, where k<n. The use of forward error correction may include implementing an algorithm that adds redundant data to each data stream in order for data flow 430B to be reconstructed when at least k encoded data streams are received and decoded at destination 120. In some examples, the implemented algorithm may be based at least on a type of forward error correction used. Types of forward error correction may include, but are not limited to, block forward error correction or convolutional forward error correction. Block forward error correction may include, but is not limited to, the use of an algorithm associated with Reed-Solomon coding, Golay coding, BCH coding, multidimensional parity coding or Hamming coding. Convolutional forward error correction may include, but is not limited to, the use of a Viterbi algorithm.

In some examples, k represents a given number or portion of encoded data streams originally forwarded from source 110 as encoded data streams 440A that can be recombined from received encoded data streams 440B to reconstruct data flow 430B. For example, FIG. 6 depicts four streams for encoded data streams 440A. If k represents a given number of 3, then separately included forward error correction in the four streams of encoded data streams 440A would enable destination stream manager 124 at destination 120 to recombine data flow 430B if encoded data streams 440B includes at least k=3 streams.

In some examples, a given number for k may be dynamically adjusted based at least upon a status for one or more networks utilized by a connectionless packet network service to forward encoded data streams to a destination. The status may be based on one or more network characteristics to include, but not limited to, a network peak usage time period, a network low usage time period, a network capacity threshold or network congestion. The one or more network characteristics may be used to determine a tradeoff between the amount of redundant data needed to provide forward error correction to reconstruct a data flow and the added overhead placed on the network due to redundant data. For example, if n data streams are encoded at a source, lower values for k relative to n would need more redundant data to reconstruct a data flow at a destination. Also, the value for n may be increased to allow for greater flexibility in dynamically adjusting the value of k. Thus, for example, if n=20 and k=19, a potential redundancy overhead would be about 5%, while if n=4 and k=3, the redundancy overhead may be about 25%, depending on coding. Therefore, with n=20 a value for k can be as low as 15 before a potential redundancy overhead of 25% is reached.

Figure 7:
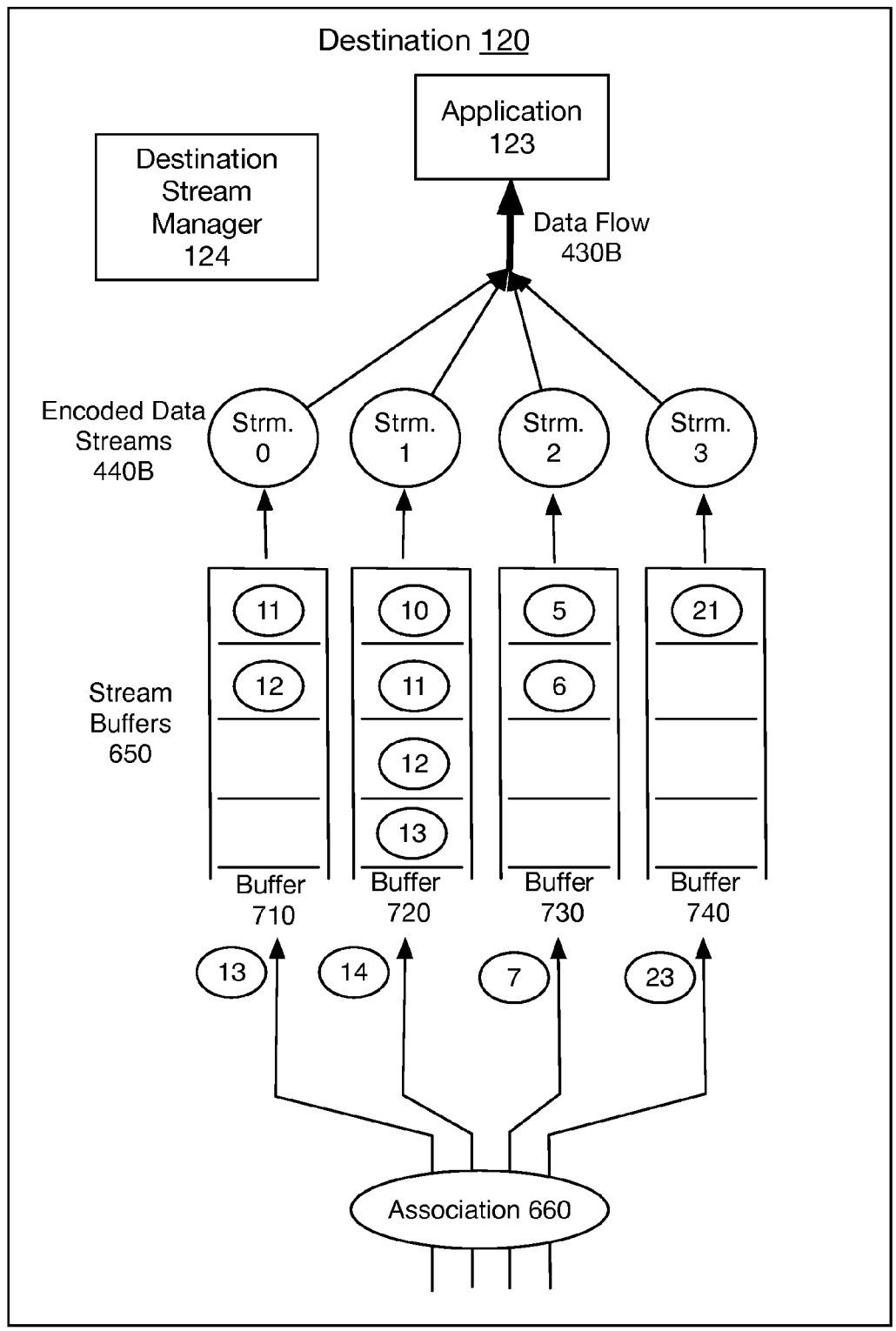
FIG. 7 illustrates a block diagram of an encoded data stream received into stream buffers and recombined to reconstruct a data flow for an application.

FIG. 7 illustrates a block diagram of encoded data stream 440B received into stream buffers 650 and recombined to reconstruct data flow 430B for application 123. As shown in FIG. 7, stream buffers 650 include buffers 710, 720, 730 and 740, although this disclosure is not limited to four buffers. In alternative examples, stream buffers 650 may include any number of buffers. Buffers 710, 720, 730 and 740 may be configured to separately receive packetized data for separate streams of encoded data streams 440B. For example, as shown in FIG. 7, buffers 710, 720, 730 and 740 may be configured to receive packetized data for streams 0, 1, 2 and 3, respectively.

In some examples, encoded data stream 440B may have an association 660 as described above for FIG. 6. Association 660 may include assigning packetized data of encoded data streams 440B sequential packet numbers to maintain an order of the packets for each encoded data stream when received and recombined at destination 120. For example, packetized data having sequential numbers 11-12 and number 21 are shown in FIG. 7 as received in buffer 710 and buffer 740, respectively for stream 0 and stream 3, respectively. Also, FIG. 7 shows sequential numbers 10-13 and 5-6 as received in buffer 720 and 730, respectively, for stream 1 and stream 2, respectively.

In some examples, head-of-the-line (HOL) blocking may result if packetized data having sequential numbering arrive at a given buffer from among stream buffers 650 out of order or out of sequence. As mentioned previously, SCTP may be used to recombine encoded data streams 440B. Use of SCTP may require strict order-of-arrival rules for each encoded data stream. As shown in FIG. 7, since packetized data with serial number 21 was the previously received packet in buffer 740 for stream 3, packetized data with serial number 23 has arrived at buffer 740 out of order. The out-of-order arrival of packetized data with serial number 23 may lead to HOL blocking for stream 3 as stream 3 may be held up or blocked while waiting for the arrival of packetized data with serial number 22. However, as shown in FIG. 7, buffers 710, 720 and 730 for streams 0, 1 and 2, respectively, have all received in-order packetized data.

In some examples, destination stream manager 124 may include logic and/or features to decode and recombine the received encoded data streams 440B. As mentioned previously, encoded data streams 440B may have been encoded at source 110 based upon each encoded data stream separately or jointly including forward error correction. Destination stream manager 124 may use that separately or jointly included forward error correction to minimize or reduce of the effects of the HOL blocking mentioned above for stream 3. For example, destination stream manager 124 may decode and recombine the portion of encoded data streams 440B that are not being held up. As mentioned above, streams 0, 1 and 2 are not experiencing HOL blocking and each stream having forward error correction may enable the recombination of these three data streams to reconstruct and provide data flow 430B to Application 123. As a result, data flow 430B may be reconstructed without waiting for stream 3 to overcome HOL blocking.

Figure 8:
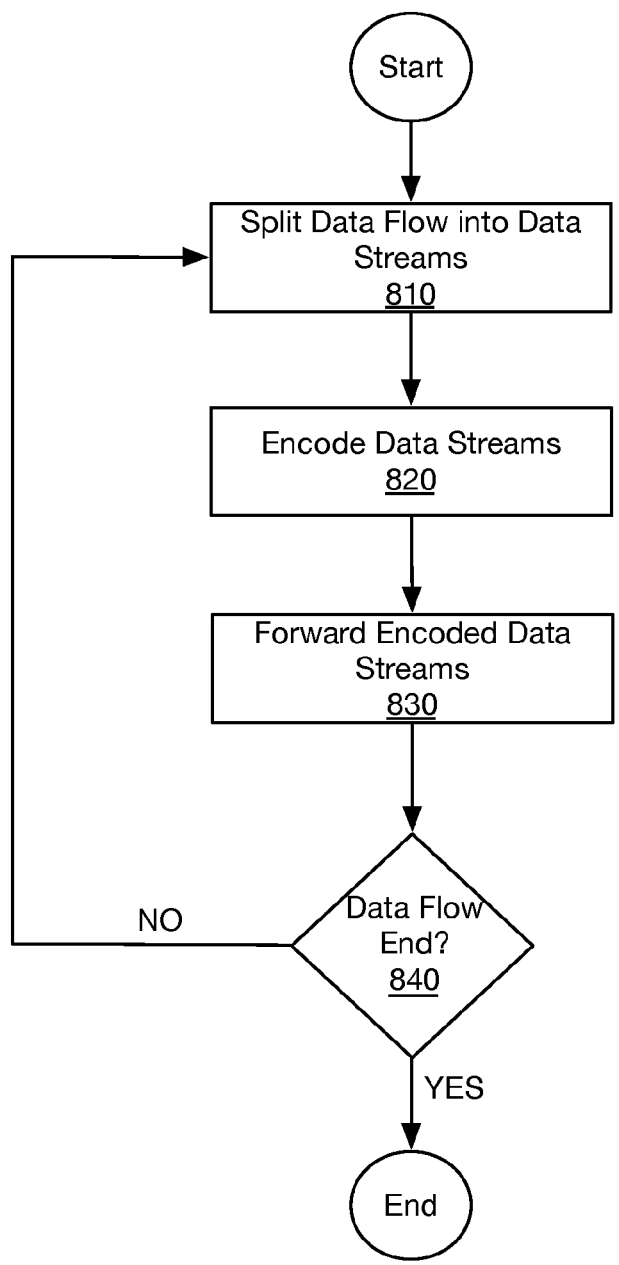
FIG. 8 illustrates a flow chart of example methods for forwarding a data flow associated with a connectionless packet network service.

FIG. 8 illustrates a flow chart of example methods for forwarding a data flow associated with a connectionless packet network service. In some examples, system 100 as shown in FIG. 1, is used to illustrate example methods related to the flow chart depicted in FIG. 8. A source stream manager 114 as shown in FIG. 2 may also be used to illustrate the example methods. But the described methods are not limited to implementations on system 100 as shown in FIG. 1 or to the source stream manager 114 shown in FIG. 2. The example methods may be implemented on other systems having one or more of the elements depicted in FIG. 1 or 2.

Beginning at block 810 (Split Data Flow into Data Streams), source stream manager 114 may include logic and/or features configured to split a data flow into data streams (e.g., via split feature 212). The data flow may have been generated or provided by application 113 and may include multimedia and/or location-dependent data. In some examples, source stream manager 114 may use a multi-streaming protocol such as SCTP to split the data flow into the data streams.

Continuing from block 810 to block 820 (Encode Data Streams), source stream manager 114 may include logic and/or features configured to encode (e.g., via encode feature 214) the split data streams based at least on each data stream including forward error correction. In some examples, as mentioned above, the forward error correction may be included such that encoded data streams may be recombined to reconstruct the data flow at a destination (e.g., destination 120) when packetized data from k<n encoded data streams are received and decoded at the destination. Where k is the minimum number of encoded data streams needed to be received to reconstruct the data flow and n is the total number of encoded data streams that were forwarded from the source.

Continuing from block 820 to block 830 (Forward Encoded Data Streams), source stream manager 114 may include logic and/or features configured to forward the encoded data streams (e.g., via forward feature 216). In some examples, the encoded data streams may be forwarded and transmitted in parallel or multi-streamed via a communication channel (e.g., communication channel 140 coupled to a network (e.g., network 130). The encoded data streams may be transmitted using a connectionless packet service that may be implemented using such industry standards as those industry standards for the Internet protocol (e.g., IPv4 or IPv6).

Continuing from block 830 to decision block 840 (Data Flow End?), source stream manager 114 may include logic and/or features configured to determine whether the data flow from application 113 has ended or stopped (e.g., via forward feature 216). If the data flow has ended or stopped the process comes to an end. Otherwise, the process moves back to block 810 and the data flow continues to be split into data streams.

Figure 9:
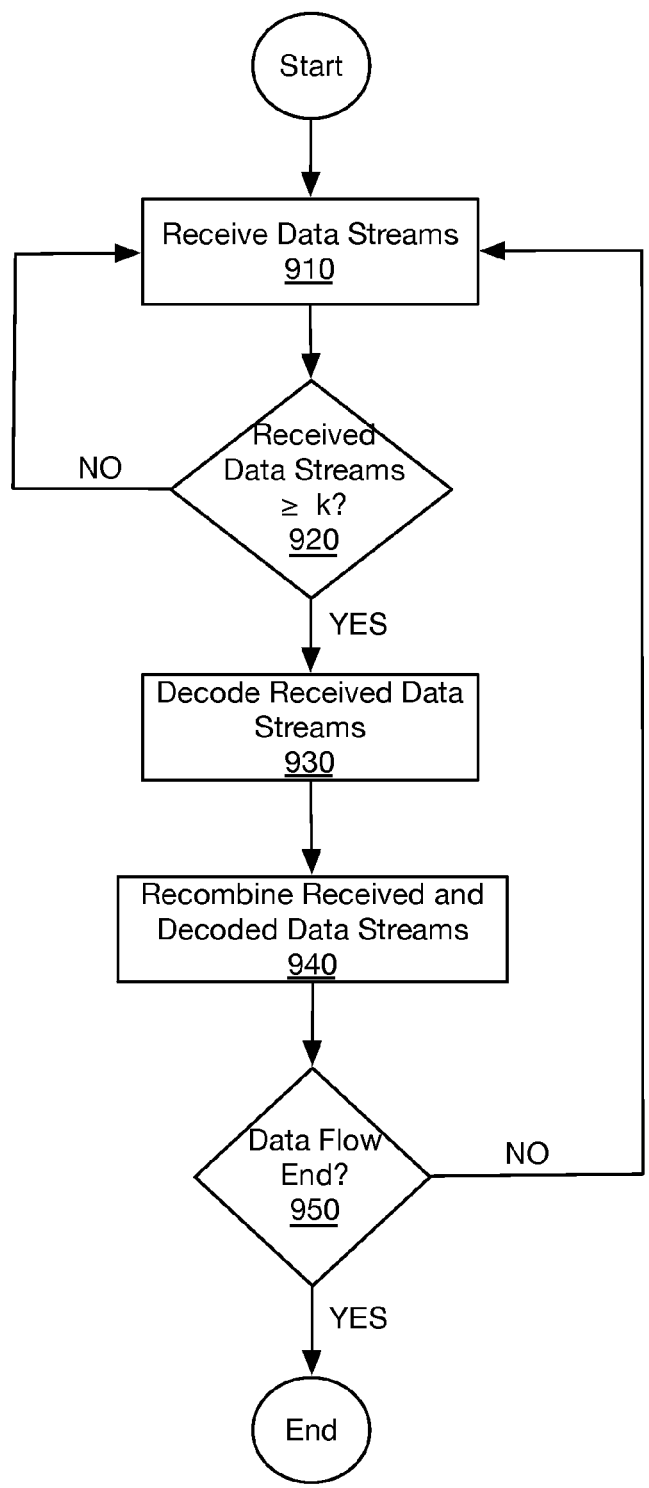
FIG. 9 illustrates a flow chart of example methods for receiving a data flow associated with a connectionless packet network service.

FIG. 9 illustrates a flow chart of example methods for receiving a data flow associated with a connectionless packet network service. In some examples, system 100 as shown in FIG. 1, is used to illustrate example methods related to the flow chart depicted in FIG. 9. A destination stream manager 124 as shown in FIG. 3 may also be used to illustrate the example methods. But the described methods are not limited to implementations on system 100 as shown in FIG. 1 or to the destination stream manager 124 shown in FIG. 3. The example methods may be implemented on other systems having one or more of the elements depicted in FIG. 1 or 3.

Beginning at block 910 (Receive Data Streams), destination stream manager 124 may include logic and/or features configured to receive encoded data streams (e.g., via receive feature 312). In some examples, the encoded data streams may have been forwarded from a source (e.g., source 110) using a connectionless packet service (e.g., implemented using IPv4 or IPv6) and received at a destination (e.g., destination 120) via a communication channel (e.g., communication channel 150) coupled to a network (e.g., network 130). The encoded data streams may also be received in a multi-stream or parallel fashion into a plurality of stream buffers that may be maintained at the destination.

Continuing from block 910 to decision block 920 (Received Data Streams≥k?), source stream manager 114 may include logic and/or features configured to determine whether a given number of encoded data streams have been received (e.g., via receive feature 312). In some examples, as mentioned above for FIG. 8, the given number may be represented by k and k may represent the minimum number of encoded data streams needed to be received to reconstruct a data flow. The data flow, for example, may have originated from an application (e.g., application 113) at a source (e.g., source 110). Further, the data flow may have been split into a plurality of data streams and encoded based at least upon each encoded data stream separately or jointly including forward error correction. For these examples, the amount of forward error correction information separately or jointly included with each encoded data stream may determine the given number for k. For example, if the given number for k is three and the total of all encoded data streams is four, then at least three of the four encoded data streams need to be received to reconstruct the data flow. So, if at least k (e.g., three) encoded data streams have been received, the process moves to block 930. Otherwise, the process moves back to block 910.

Proceeding from decision block 920 to block 930 (Decode Received Data Streams), destination stream manager 124 may include logic and/or features configured to decode the received encoded data streams (e.g., via decode feature 314). In some examples, the received encoded data streams may be decoded based, at least in part, on use of SCTP as described in RFC 4960.

Continuing from block 930 to block 940 (Recombine Received and Decoded Data Streams), destination stream manager 124 may include logic and/or features configured to recombine (e.g., via recombine feature 316) received and decoded data streams. In some examples, the received and decoded data streams may be recombined to reconstruct the data flow mention above for decision block 920. For these examples, the received and decoded data streams may be recombined to reconstruct the data flow based at least on using the separately or jointly included forward error correction included in each of the received and decoded data streams. The data flow may also be reconstructed based at least on using SCTP. Also, using SCTP, the data flow may be provided to an application (e.g., application 123) at the destination.

Continuing from block 940 to decision block 950 (Data Flow End?), destination stream manager 124 may include logic and/or features configured to determine whether reconstruction of the data flow has ended or stopped (e.g., via recombine feature 316). If the reconstruction has ended or stopped the process comes to an end. Otherwise, the process moves back to block 910 and additional data streams may be received.

FIG. 10 illustrates a block diagram of an example computer program product 1000. In some examples, as shown in FIG. 10, computer program product 1000 includes a signal bearing medium 1002 that may also include instructions 1004 for receiving a data flow associated with a connectionless network service. Instructions 1004, which, when executed by logic (e.g., destination logic 310), may cause the logic to receive a portion of a plurality of encoded data streams. The plurality of encoded data streams may have been split from the data flow. Also, the plurality of encoded data streams may have been encoded based at least upon each encoded data stream separately or jointly including forward error correction. The instructions 1004 may also cause the logic to decode the portion of the plurality of encoded data streams. The instruction 1004 may further cause the logic to recombine the decoded portion of the plurality of encoded data streams to reconstruct the data flow such that the data flow is reconstructed prior to receipt and decoding of all the encoded data streams of the plurality of encoded data streams.

Also depicted in FIG. 10, in some examples, computer product 1000 may include one or more of a computer readable medium 1006, a recordable medium 1008 and a communications medium 1010. The dotted boxes around these elements depict different types of mediums included within, but not limited to, signal bearing medium 1002. These types of mediums may distribute instructions 1004 to be executed by logic (e.g., source logic 210 or destination logic 310). Computer readable medium 1006 and recordable medium 1008 may include, but are not limited to, a flexible disk, a hard disk drive (HDD), a Compact Disc (CD), a Digital Versatile Disk (DVD), a digital tape, a computer memory, etc. Communications medium 1010 may include, but is not limited to, a digital and/or an analog communication medium (e.g., a fiber optic cable, a waveguide, a wired communication link, a wireless communication link, etc.).

Figure 11:
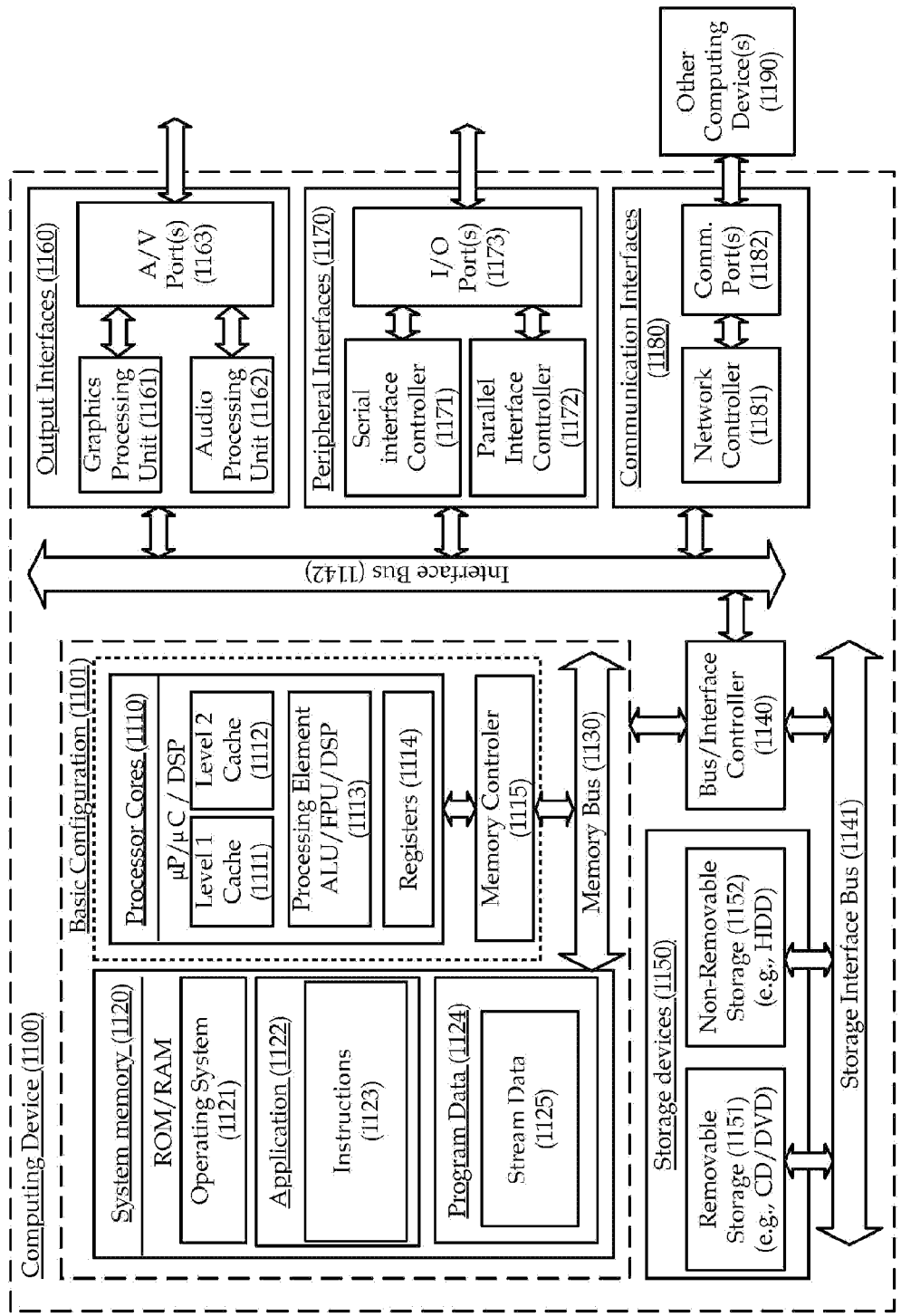
FIG. 11 illustrates an example computing device, arranged in accordance with the present disclosure.

FIG. 11 illustrates an example computing device 1100. In some examples, source stream manager 114 or destination stream manager 124 depicted in FIGS. 1-3 may be implemented on computing device 1100. In these examples, elements of computing device 1100 may be arranged or configured for forwarding or receiving a data flow associated with a connectionless packet network service. In a very basic configuration 1101, computing device 1100 typically includes one or more processors 1110 and system memory 1120. A memory bus 1130 can be used for communicating between the processor 1110 and the system memory 1120.

Depending on the desired configuration, processor 1110 can be of any type including but not limited to a microprocessor (µP), a microcontroller (µC), a digital signal processor (DSP), or any combination thereof. Processor 1110 can include one or more levels of caching, such as a level one cache 1111 and a level two cache 1112, a processor core 1113, and registers 1114. The processor core 1113 can include an arithmetic logic unit (ALU), a floating point unit (FPU), a digital signal processing core (DSP Core), or any combination thereof. A memory controller 1115 can also be used with the processor 1110, or in some implementations the memory controller 1115 can be an internal part of the processor 1110.

Depending on the desired configuration, the system memory 1120 can be of any type including but not limited to volatile memory (such as RAM), non-volatile memory (such as ROM, flash memory, etc.) or any combination thereof. System memory 1120 typically includes an operating system 1121, one or more applications 1122, and program data 1124. Application 1122 includes instructions 1123 that are arranged to perform the functions as described herein including the actions described with respect to the source stream manager 114 architecture shown in FIG. 2 or to the destination stream manager 124 architecture shown in FIG. 3. Program Data 1124 includes stream data 1125 that is useful for implementing instructions 1123 (e.g., splitting and reconstructing data flows). In some examples, application 1122 can be arranged to operate with program data 1124 on an operating system 1121 such that implementations forwarding or receiving a data flow associated with a connectionless packet network service may be provided as described herein. This described basic configuration is illustrated in FIG. 11 by those components within dashed line 1101.

Computing device 1100 can have additional features or functionality, and additional interfaces to facilitate communications between the basic configuration 1101 and any required devices and interfaces. For example, a bus/interface controller 1140 can be used to facilitate communications between the basic configuration 1101 and one or more data storage devices 1150 via a storage interface bus 1141. The data storage devices 1150 can be removable storage devices 1151, non-removable storage devices 1152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 1120, removable storage 1151 and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media can be part of device 1100.

Computing device 1100 can also include an interface bus 1142 for facilitating communication from various interface devices (e.g., output interfaces, peripheral interfaces, and communication interfaces) to the basic configuration 1101 via the bus/interface controller 1140. Example output interfaces 1160 include a graphics processing unit 1161 and an audio processing unit 1162, which can be configured to communicate to various external devices such as a display or speakers via one or more A/V ports 1163. Example peripheral interfaces 1170 include a serial interface controller 1171 or a parallel interface controller 1172, which can be configured to communicate with external devices such as input devices (e.g., keyboard, mouse, pen, voice input device, touch input device, etc.) or other peripheral devices (e.g., printer, scanner, etc.) via one or more I/O ports 1173. An example communication interface 1180 includes a network controller 1181, which can be arranged to facilitate communications with one or more other computing devices 1190 over a network communication via one or more communication ports 1182. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 1100 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 1100 can also be implemented as a personal computer including both laptop computer and non-laptop computer configurations or implemented in a workstation or a server configuration.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality.

Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for forwarding a data flow associated with a connectionless packet network service, the method comprising:

splitting the data flow into a plurality of data streams;

encoding the plurality of data streams based at least upon each data stream of the plurality of data streams separately including forward error correction;

respectively forwarding the encoded plurality of data streams via multiple routes to a destination; and reconstructing the data flow based on at least a portion of the encoded plurality of data streams prior to receiving and decoding all the encoded plurality of data streams, wherein the portion of the encoded plurality of data streams includes a given number of the encoded plurality of data streams, and wherein the given number is dynamically adjusted based at least upon a status for one or more networks utilized by the connectionless packet network service to forward the encoded plurality of data streams to the destination.

2. A method according to claim 1, wherein the data flow is to be reconstructed using the separately included forward error correction.

3. A method according to claim 1, wherein the forwarding the encoded plurality of data streams comprises transmitting the data streams in parallel using the connectionless packet service.

4. A method according to claim 3, wherein the connectionless packet service comprises an Internet Protocol to include at least one of Internet Protocol Version 4 (IPv4) or Internet Protocol Version 6 (IPv6).

5. A method according to claim 1, wherein the splitting the data flow into the plurality of data streams, comprises splitting the data flow using a stream control transmission protocol (SCTP).

6. A method according to claim 1, wherein the status for the one or more networks utilized by the connectionless packet network service includes at least one of a network peak usage time period, a network low usage time period, a network capacity threshold, or network congestion.

7. A method for receiving a data flow associated with a connectionless packet network service, the method comprising:

receiving a portion of a plurality of encoded data streams, the plurality of encoded data streams split from the data flow and respectively forwarded via multiple routes, wherein the plurality of encoded data streams are encoded based at least upon each encoded data stream of the plurality of encoded data streams separately including forward error correction;

decoding the portion of the plurality of encoded data streams; and recombining the decoded portion of the plurality of encoded data streams to reconstruct the data flow such that the data flow is reconstructed prior to receipt and decoding of all the encoded data streams of the plurality of encoded data streams, wherein the portion of the plurality of encoded data streams includes a given number of encoded data streams, and wherein the given connectionless packet network service receives the portion of the plurality of encoded data streams.

8. A method according to claim 7, wherein the data flow is reconstructed using the separately included forward error correction.

9. A method according to claim 7, wherein the receiving the portion of the plurality of encoded data streams comprises receiving the portion of the plurality of data streams in parallel using the connectionless packet service.

10. A method according to claim 9, wherein the connectionless packet service comprises at least one of Internet Protocol Version 4 (IPv4) or Internet Protocol Version 6 (IPv6).

11. A method according to claim 7, wherein the decoding the portion of the plurality of encoded data streams is based at least upon using a stream control transmission protocol (SCTP).

12. A method according to claim 7, wherein the status for the network utilized by the connectionless packet network service includes at least one of a network peak usage time period, a network low usage time period, a network capacity threshold, or network congestion.

13. An apparatus for forwarding a data flow associated with a connectionless packet service, the apparatus comprising:
a source stream manager having logic, the logic configured to:
split the data flow into a plurality of data streams;
encode the plurality of data streams based at least upon each data stream of the plurality of data streams separately including forward error correction;
respectively forward the encoded plurality of data streams via multiple routes to a destination; and
reconstruct the data flow based on at least a portion of the encoded plurality of data streams prior to receiving and decoding all the encoded plurality of data streams,
wherein the portion of the encoded plurality of data streams includes a given number of the encoded plurality of data streams, and
wherein the given number is dynamically adjusted based at least upon a status for one or more networks utilized by the connectionless packet network service to forward the encoded plurality of data streams to the destination.

14. An apparatus according to claim 13, wherein the data flow is to be reconstructed using the separately included forward error correction.

15. An apparatus according to claim 13, wherein the logic is further configured to cause the encoded plurality of data streams to be transmitted in parallel using the connectionless packet service.

16. An apparatus according to claim 15, wherein the connectionless packet service comprises at least one of Internet Protocol Version 4 (IPv4) or Internet Protocol Version 6 (IPv6).

17. An apparatus according to claim 13, wherein the logic is further configured to split the data flow using a stream control transmission protocol (SCTP).

18. A system for receiving a data flow associated with a connectionless packet network service, the system comprising:
a memory configured to maintain an application; and
a destination stream manager including logic configured to:
receive a portion of a plurality of encoded data streams for the application,
wherein the plurality of encoded data streams are split from the data flow,
wherein the plurality of encoded data streams are respectively forwarded via multiple routes, and
wherein the plurality of encoded data streams are encoded based at least upon each encoded data stream of the plurality of encoded data streams separately including forward error correction;
decode the portion of the plurality of encoded data streams; and
recombine the decoded portion of the plurality of encoded data streams to reconstruct the data flow such that the data flow is reconstructed prior to all the encoded data streams of the plurality of encoded data streams are received and decoded,
wherein the portion of the plurality of encoded data streams includes a given number of encoded data streams, and
wherein the given number is dynamically adjusted based at least upon a status for one or more networks utilized by the connectionless packet network service to receive the portion of the plurality of encoded data streams.

19. A system according to claim 18, wherein the data flow is to be reconstructed using the separately included forward error correction.

20. A system according to claim 18, wherein the logic is further configured to receive the portion of the plurality of data streams in parallel using the connectionless packet service.

21. A system according to claim 20, wherein the connectionless packet service comprises an Internet Protocol to include at least one of Internet Protocol Version 4 (IPv4) or Internet Protocol Version 6 (IPv6).

22. A system according to claim 18, wherein the logic is configured to decode the portion of the plurality of encoded data streams based at least upon use of a stream control transmission protocol (SCTP).

23. A system according to claim 18, wherein the application comprises an Internet browser having at least one of a multimedia capability or a location-dependent capability.

24. A non-transitory computer-readable medium that stores executable instructions that, when executed, cause one or more processors to perform operations comprising:
receiving a data flow associated with a connectionless network service, which, when executed by logic, cause the logic to:
receive a portion of a plurality of encoded data streams,
wherein the plurality of encoded data streams are split from the data flow,
wherein the plurality of encoded data streams are respectively forwarded via multiple routes, and
wherein the plurality of encoded data streams are encoded based at least upon each encoded data stream of the plurality of encoded data streams separately including forward error correction;
decode the portion of the plurality of encoded data streams; and
recombine the decoded portion of the plurality of encoded data streams to reconstruct the data flow such that the data flow is reconstructed prior to all the encoded data streams of the plurality of encoded data streams are received and decoded,
wherein the portion of the plurality of encoded data streams includes a given number of encoded data streams, the given number dynamically adjusted based at least upon a status for a network utilized by the connectionless packet network service to receive the portion of the plurality of encoded data streams.

25. A non-transitory computer-readable medium according to claim 24, wherein the data flow is reconstructed using the separately included forward error correction.

26. A non-transitory computer-readable medium according to claim 24, wherein to receive the portion of the plurality of encoded data streams comprises to receive the portion of the plurality of data streams in parallel using the connectionless packet service.

27. A computer-readable medium according to claim 24, wherein the status for the network utilized by the connectionless packet network service includes at least one of a network peak usage time period, a network low usage time period, a network capacity threshold, or network congestion.

* * * * *

UNITED STATES PATENT AND TRADEMARK OFFICE
CERTIFICATE OF CORRECTION

| | | |
|---|---|---|
| PATENT NO. | : 8,943,380 B2 | Page 1 of 1 |
| APPLICATION NO. | : 13/500881 | |
| DATED | : January 27, 2015 | |
| INVENTOR(S) | : Kruglick | |

It is certified that error appears in the above-identified patent and that said Letters Patent is hereby corrected as shown below:

In the Drawings

In Fig. 10, Sheet 9 of 10, in Box "1004", in Line 1, delete "for for" and insert -- for --, therefor.

In Fig. 11, Sheet 10 of 10, in Box "(1115)", in Line 1, delete "Memory Controler" and insert -- Memory Controller --, therefor.

In the Specification

In Column 1, below Title, insert -- CROSS-REFERENCE TO RELATED APPLICATIONS
The present application is a U.S. national stage filing under 35 U.S.C. §371 of International Application No. PCT/US2010/058231, filed on Nov. 29, 2010. --.

In Column 4, Line 5, delete "network 120" and insert -- network 130 --, therefor.

In Column 8, Line 19, delete "feature 214)" and insert -- feature 314) --, therefor.

In Column 9, Line 49, delete "manager 113" and insert -- manager 114 --, therefor.

In the Claims

In Column 21, Line 1, in Claim 27, delete "A computer-readable" and insert -- A non-transitory computer-readable --, therefor.

Signed and Sealed this
Twenty-third Day of June, 2015

Michelle K. Lee
*Director of the United States Patent and Trademark Office*